United States Patent Office 3,536,920
Patented Oct. 27, 1970

3,536,920
FLEXIBLE RADIATION SHIELDING MATERIAL
Steve Sedlak, 115 E. 9th St., New York, N.Y. 10003, and Albert Mavromatis, Jackson Heights, and Jan M. Krol, New York, N.Y.; said Mavromatis and Krol assignors to said Sedlak
No Drawing. Filed Aug. 9, 1966, Ser. No. 571,188
Int. Cl. G21f 1/00, 3/00, 5/00, 7/00
U.S. Cl. 250—108        5 Claims

ABSTRACT OF THE DISCLOSURE

A flexible radiation shielding material suitable for use in continuous production as a dipping compound. The material consists of an elastomeric base, such as, rubber, having a filler of powdered metal. The powdered metal consists of a radiation shielding metal, such as, lead, alloyed with tin or antimony.

---

This invention relates to flexible materials containing a high proportion of metal having radiation-absorbing characteristics and, more particularly, to a new and improved flexible radiation-absorbing material especially adapted for fabrication of articles in a continuous production process.

Ordinarily, radiation-absorbing characteristics are imparted to materials by incorporating into them metallic elements which have both high density and atomic number, such as lead, tungsten, uranium and the like, lead being the most commonly used metal for this purpose. In order to produce such composite materials which are sufficiently flexible to form articles to be worn, such as gloves, the matrix usually consists of an elastomeric material (i.e., material having rubberlike properties) such as natural and synthetic rubber, or flexible organic polymers, such as polyurethane and polyvinyl chloride and the like. The metallic element is usually homogeneously dispersed throughout the elastomeric matrix in powder form. Even though the elastomer may be a stable compound, in many cases the addition of the metallic powder produces deleterious effects in the composite material due to the chemical interaction between the two components. For example, lead powder added to natural or to some synthetic rubber latices promotes vulcanization prior to cure while in the liquid state. This occurs because the surface of each lead particle is usually covered with some lead oxide, or other lead compounds, obtained as a result of oxidation or chemical reaction, and these surface films act as an accelerator agent to the rubber. As a result, the latex compound containing sizeable proportion of lead cannot be used for continuous production of flexible articles because the compound quickly deteriorates and becomes useless.

Heretofore, various attempts have been made to overcome this problem but none has been entirely successful. One proposal has been to coat the particles with an inert substance. However, it is extremely difficult to obtain completely uniform films surrounding each particle and coating powder in bulk tends to produce agglomeration, etc., which materially affects the handling characteristics of the powder. Another proposal has been to reduce the chemical reactivity between the elastomer and the metal by modifying the composition of the elastomer, as by decreasing the sulfur content of the rubber. Changes made in the elastomer to accommodate the metal leads to less satisfactory product, and excludes the use of tried and tested elastomer compounds, particular fast curing rubber latices. A different approach has been to use nonreactive chemical compounds of the metallic element, such as lead titanate, as the filler but this method suffers from the serious disadvantage of reducing the radiation-absorption capability of the loaded elastomeric material to as little as one-fifth of the shielding possible with pure lead powder.

Accordingly, it is an object of the present invention to provide a new and improved flexible radiation-shielding material which overcomes the above-mentioned difficulties of the prior art.

Another object of the invention is to provide a flexible radiation-shielding material suitable for use in continuous production as a dipping compound.

A further object of the invention is to provide a new and improved process for making a flexible radiation-shielding material.

These and other objects of the invention are attained by alloying the radiation-absorbing metal with a small proportion of one or more other elements and adding the alloy to the elastomeric material to provide a highly loaded flexible radiation-shielding material. It has been found that the problems encountered with certain radiation-shielding metals can be eliminated by forming alloys containing only about one-half percent to twenty percent and preferably less than ten percent of other elements. For example, the above-mentioned acceleration of vulcanization of rubber latex can be avoided by using lead alloy powders containing five to ten percent tin or five percent antimony.

Further objects and advantages of the invention will be apparent from a reading of the following detailed description of representative embodiments.

Pure metals are modified both physically and chemically by addition of varying amounts of other elements to form alloys. (The term alloy refers to a combination of two or more elements which exhibit metallic properties.) The resulting properties of the alloy differ appreciably from those of the parent elements. Even minute amounts of an alloying element within a base metal may produce significant metallurgical changes, and thereby affect the physical and chemical nature of the base material. Alloys are usually made by a solution process where at an elevated temperature the elements dissolve in each other to form a single phase. Upon cooling, the alloy may have one or more interspersed phases.

Since lead, due to its low cost, excellent radiation-absorbing characteristics for X-rays and gamma rays, and ease of powder manufacture, is used extensively, the discussion which follows is devoted to lead powder, its reactivity and its use with elastomers. However, any other radiation-shielding metal which also offers problems in reactivity can be handled similarly.

Metallic lead is known to be a chemically reactive substance. When lead is freshly prepared or when cut, the lead surface is bright and shiny in appearance. Upon exposure to air this surface tarnishes and becomes dull gray, due to the formation of a film of lead oxides and basic lead carbonate. Lead in contact with hard water becomes coated wits a film of insoluble lead salts, depending on the nature of the dissolved chemicals in the hard water. This film may contain basic lead carbonate, lead sulfate, lead phosphate, etc. Lead in contact with distilled water or rainwater, which contains dissolved oxygen, is attacked to form soluble lead hydroxide. Lead in contact with many other chemicals forms various lead compounds.

Freshly manufactured lead powder, though shiny in appearance at first, upon exposure to air tarnishes rapidly. If the powder is used immediately and placed in a solution or mixture which is free of all chemicals that could possibly attack the lead surface, then no surface lead compounds would be formed. Generally, it is very difficult to obtain commercial lead powder that has not been exposed to air. Also, many applications require that certain chemicals be present in the elastomeric material for proper compounding and processing of the elastomer. For example, sulfur is used extensively in rubbers as a vulcanizing agent and sulfur does combine with lead during the compounding process to form lead sulfide, which shows up as a blackening of the stock.

Many lead compounds, including lead monoxide and lead carbonate, act as accelerators for various types of rubber latices. Their presence in a rubber latex in any large quantity produces incipient vulcanization, increased viscosity, possible gelation and overcured articles. Experiments made with prevulcanized natural rubber latex filled with lead powder, showed that the lead compounds derived from the lead powder reacted to produce incipient vulcanization of the latex, resulting in weak and cracked products.

In accordance with the invention, the metallic powder used in a flexible radiation-shielding material is alloyed to prevent deleterious reaction with the elastomeric material in which it is to be incorporated. Where lead is the radiation-absorbing material, it may be alloyed with tin, antimony, bismuth, barium, cadmium, silver, or other elements, separately or in combination. Such alloys no longer react with the elastomeric material and, consequently, extend the pot life of dipping compounds to a time commensurate with that required for continuous production processes.

The amount of alloying elements used may vary from 0.5 to 50 percent with the balance being lead. For best results, the amount of alloying elements should be between 0.5 and 20 percent, and preferably less than ten percent. When this range is used, the dilution of lead in its radiation-absorbing characteristics is kept low. The content by weight of the radiation-absorbing alloy in the flexible material may be, for example, from 80 to 95 percent.

Direct comparison of lead alloys to lead compounds shows that the alloys are far superior as radiation-shielding materials. The reduction in shielding characteristics is low for alloys because the alloying elements have good radiation absorption and the amount used is small, whereas lead compounds have non-absorbing elements, such as oxygen, containing within them and these are present in large proportions. Actual measurements made with a 10 percent tin/90 percent lead alloy shows only a slight difference in comparison to 100 percent lead, and, for all practical purposes, can be considered to be solid lead insofar as radiation-shielding properties are concerned.

It should be noted that, though lead has been discussed in detail, any other radiation-shielding metal may be modified similarly where reactivity in an elastomer-metal composite is found.

The following radiation-absorbing powders have proved satisfactory in elastomeric compositions:

(1) 5 percent tin/95 percent lead
(2) 10 percent tin/90 percent lead
(3) 5 percent antimony/95 percent lead.

Any one of these alloys may be used in the two examples of elastomer-metal composites described below.

EXAMPLE A

| | Parts by weight |
|---|---|
| Prevulcanized natural rubber latex | 100 |
| 10% KOH solution | 1 |
| Surface active agent | 4 |
| Lead alloy powder | 705 |

The natural rubber latex, No. BL–5108, was obtained from Berco Industries Corporation of Westbury, N.Y. The surface active agent, Darvan No. 7, was supplied by R. T. Vanderbilt Company; and is a 25 percent polyelectrolyte solution used for stabilizing the compound. The lead alloy powders used were supplied by Welded Carbide Company of Clifton, N.J. The 10% KOH solution and latex are first mixed together. Then the alloy powder was added and thoroughly stirred until a homogeneous dispersion is obtained. The compound was left to stand for 24 hours until all the trapped air escaped; and then the surface active agent was added. The shelf life of this mixture was about six months.

Regular porcelain forms were dipped into this compound to form gloves. Gloves made with this compound had lead equivalence ranging between 0.02 to 2.0 millimeters of lead, depending on number of dips. This wide range includes most present practical applications for gloves and similar products.

For many applications, it is desirable to apply surface coats to the highly-loaded dipped articles. Coating the radiation barrier material has several advantages. It increases the tensile strength and tear strength and thereby prolongs the service life of the product. Color and texture of surfaces can be controlled. Surface coats are made by dipping the forms in unfilled latex stock at both the beginning and completion of the dipping operations. These surface coats need not be of the same latex or rubber as that used in the filled compound. Sometimes increased chemical resistance or other specific characteristics are desired for these surface coats depending on the end use of the radiation-shielding product. Service requirement for gauntlet used in hot box applications differ from those gloves in radiological and fluoroscopic applications.

In many cases, the inside of the glove may be flocked to permit ease of insertion and withdrawal of hands and to give the wearer a more comfortable sense. In other cases, a thin cotton glove insert or one made of synthetic fibers is used.

The latex compound may be used also for making sheet material by spreading it on a flat rock or on a fabric. The more desirable type fabric is a "spandex" elastic-stretch type. Outer coatings may be applied to one or both sides of the flat radiation barrier material.

EXAMPLE B

| | Parts by weight |
|---|---|
| Polyvinyl chloride dispersion resin | 100 |
| Di (2-ethylhexyl) phthalate | 200 |
| Organotin stabilizer | 1 |
| Lead alloy powder | 3000 |

The above are mechanically stirred together to form a homogeneous mixture. The composition may be used with other plasticizers and stabilizers than those given. Sheets are cast on flat stock and cured in the conventional manner. Again skins of unfilled vinyl are used where added strength, color or texture are required. Fabric may be added to one or both sides for added durability and appearance. The fabric found to be most effective is the "spandex" elastic-stretch type.

The above formulations may be used to make articles of wear, such as gloves, gauntlets, aprons, caps and the like, and have excellent shielding characteristics for X-rays and low-energy gamma rays. Considerable added flexibility and softness may be imparted to these articles when the method described in the Sedlak et al. U.S. patent application, Ser. No. 449,593, filed Apr. 20, 1965, titled "Composite Flexible Material," is employed. By this method, lower elastic modulus, higher elongation, increased flexibility and softness is imparted to the composite elastomer-metal material than is ordinarily possible by conventional methods. The method employed is essentially to dewet the particles from the surrounding elastomer.

Although the invention has been described herein with reference to specific embodiments, many modifications and variations therein will readily occur to those skilled in the art. Accordingly, all such variations and modifications are included within the intended scope of the invention as defined by the following claims.

We claim:

1. A flexible radiation-shielding material comprising an elastomeric matrix material and a high proportion of filler particles uniformly distributed throughout the matrix material, the filler particles comprising an alloy of a radiation-absorbing metal, which by itself causes a detrimental reaction with the matrix material, and at least one other metal, whereby the alloy does not cause a detrimental reaction with the matrix material.

2. A flexible radiation-shielding material according to claim 1 wherein the radiation-absorbing metal is lead.

3. A flexible radiation-shielding material according to claim 2 wherein the other metal is tin.

4. A flexible radiation-shielding material according to claim 2 wherein the other metal is antimony.

5. A flexible radiation-shielding material according to claim 1 wherein the elastomeric matrix material is rubber.

References Cited

UNITED STATES PATENTS

| | | |
|---|---|---|
| 1,580,857 | 4/1926 | Richards. |
| 2,986,533 | 5/1961 | Kurtz _____ 250—108 |
| 3,039,000 | 6/1962 | Kieffer et al. _____ 250—108 |

ARCHIE R. BORCHELT, Primary Examiner

U.S. Cl. X.R.

252—478